(12) United States Patent
Papa et al.

(10) Patent No.: US 11,412,020 B2
(45) Date of Patent: Aug. 9, 2022

(54) WIRELESS BROADBAND NETWORK WITH INTEGRATED STREAMING MULTIMEDIA SERVICES

(71) Applicant: Parallel Wireless, Nashua, NH (US)

(72) Inventors: Steven Paul Papa, Wyndham, NJ (US); Rajesh Kumar Mishra, Westford, MA (US)

(73) Assignee: Parallel Wireless, Inc., Nashua, NH (US)

( * ) Notice: Subject to any disclaimer, the term of this patent is extended or adjusted under 35 U.S.C. 154(b) by 0 days.

(21) Appl. No.: 14/436,852

(22) PCT Filed: Oct. 18, 2013

(86) PCT No.: PCT/US2013/065573
§ 371 (c)(1),
(2) Date: Apr. 17, 2015

(87) PCT Pub. No.: WO2014/062996
PCT Pub. Date: Apr. 24, 2014

(65) Prior Publication Data
US 2016/0173555 A1 Jun. 16, 2016

Related U.S. Application Data

(60) Provisional application No. 61/716,194, filed on Oct. 19, 2012.

(51) Int. Cl.
*H04L 65/60* (2022.01)
*H04L 67/568* (2022.01)
(Continued)

(52) U.S. Cl.
CPC .......... *H04L 65/605* (2013.01); *H04L 65/103* (2013.01); *H04L 65/4084* (2013.01);
(Continued)

(58) Field of Classification Search
None
See application file for complete search history.

(56) References Cited

U.S. PATENT DOCUMENTS 8,046,453 B2   10/2011   Olaiya
8,095,682 B2   1/2012   Luzzatti et al.
(Continued)

FOREIGN PATENT DOCUMENTS

EP   0914744 B1   5/2003
WO   2000045560 A2   8/2000
(Continued)

OTHER PUBLICATIONS

Notification of Transmittal of the International Search Report and the Written Opinion of the International Searching Authority, or the Declaration, for PCT/US13/65573, dated Apr. 23, 2014, 7 pages.

*Primary Examiner* — Joshua Joo
(74) *Attorney, Agent, or Firm* — Michael Y. Saji; David W. Rouille

(57) ABSTRACT

In this invention, we disclose a multimedia streaming base station used preferably in a wireless communication network. The multimedia streaming base station is capable of capturing, storing, encoding, and transmitting multimedia via a local multimedia capture device. The multimedia base station can be a heterogeneous multi-RAT node, in which case the wireless communication network could be a heterogeneous mesh network. The multimedia base station could by a dynamic mesh node in alternate embodiments. Additional embodiments of the present invention include methods for facilitating streaming of locally captured multimedia content.

10 Claims, 3 Drawing Sheets

(51) Int. Cl.
  *H04L 67/10*   (2022.01)
  *H04W 88/08*   (2009.01)
  *H04W 12/00*   (2021.01)
  *H04L 65/612*  (2022.01)
  *H04L 65/1023* (2022.01)
  *H04W 12/06*   (2021.01)

(52) U.S. Cl.
  CPC .......... *H04L 67/10* (2013.01); *H04L 67/2842* (2013.01); *H04W 12/00* (2013.01); *H04W 12/06* (2013.01); *H04W 88/08* (2013.01)

(56) References Cited

U.S. PATENT DOCUMENTS

| | | | |
|---|---|---|---|
| 8,189,517 B2 | 5/2012 | Benveniste | |
| 8,412,841 B1 | 4/2013 | Swaminathan et al. | |
| 8,654,684 B1* | 2/2014 | Pai | H04N 21/2181 370/236 |
| 2002/0124098 A1* | 9/2002 | Shaw | H04L 29/06027 709/231 |
| 2002/0186665 A1* | 12/2002 | Chaffee | H04L 45/00 370/255 |
| 2006/0120326 A1 | 6/2006 | Takeuchi et al. | |
| 2006/0184978 A1* | 8/2006 | Casey | H04H 20/08 725/87 |
| 2007/0225034 A1* | 9/2007 | Schmidt | H01Q 9/14 455/552.1 |
| 2007/0232221 A1* | 10/2007 | Miyata | H04H 60/42 455/3.01 |
| 2008/0151834 A1* | 6/2008 | Natarajan | H04L 45/125 370/331 |
| 2008/0219376 A1 | 9/2008 | Qi et al. | |
| 2008/0287142 A1* | 11/2008 | Keighran | G06Q 30/02 455/456.5 |
| 2008/0310365 A1* | 12/2008 | Ergen | H04W 36/02 370/331 |
| 2009/0144390 A1* | 6/2009 | Previdi | H04L 45/04 709/217 |
| 2009/0149221 A1* | 6/2009 | Liu | H04W 88/085 455/561 |
| 2010/0103855 A1 | 4/2010 | Wang et al. | |
| 2011/0113122 A1 | 5/2011 | Drope | |
| 2011/0141887 A1* | 6/2011 | Klein | H04W 4/00 370/230 |
| 2012/0016951 A1* | 1/2012 | Li | H04L 67/10 709/217 |
| 2012/0176900 A1* | 7/2012 | Steer | H04L 45/12 370/235 |
| 2012/0178426 A1* | 7/2012 | Filipov | H04L 12/281 455/414.1 |
| 2012/0179835 A1* | 7/2012 | Morris | G06K 9/00295 709/238 |
| 2012/0270504 A1* | 10/2012 | Zhang | H04W 24/08 455/62 |
| 2012/0290411 A1* | 11/2012 | Damola | G06Q 30/02 705/14.73 |
| 2013/0003708 A1 | 1/2013 | Ko et al. | |
| 2013/0007186 A1* | 1/2013 | Liu | H04L 67/289 709/213 |
| 2013/0051300 A1* | 2/2013 | He | H04L 12/189 370/312 |
| 2013/0097291 A1 | 4/2013 | Afergan et al. | |
| 2013/0182631 A1 | 7/2013 | Jamadagni et al. | |
| 2013/0219005 A1* | 8/2013 | Kotecha | H04W 4/18 709/212 |
| 2013/0322267 A1* | 12/2013 | Edara | H04B 7/063 370/252 |
| 2014/0173034 A1* | 6/2014 | Liu | H04L 67/1063 709/217 |
| 2014/0226602 A1* | 8/2014 | Zakrzewski | H04L 49/15 370/329 |
| 2014/0341104 A1 | 11/2014 | Zhao et al. | |
| 2014/0359683 A1* | 12/2014 | Applegate | H04N 21/2225 725/95 |
| 2015/0003234 A1* | 1/2015 | Samardzija | H04W 28/0231 370/229 |
| 2015/0189543 A1 | 7/2015 | Stassen et al. | |
| 2015/0222536 A1 | 8/2015 | Bergman | |
| 2016/0183136 A1* | 6/2016 | Comeau | H04W 76/34 370/331 |
| 2016/0269484 A1* | 9/2016 | Welts | G06F 17/30017 |
| 2016/0345235 A1* | 11/2016 | Ji | H04L 45/00 |

FOREIGN PATENT DOCUMENTS

| | | |
|---|---|---|
| WO | 2010053348 A2 | 5/2010 |
| WO | 20120138273 A1 | 10/2012 |
| WO | 20120138817 A1 | 10/2012 |

* cited by examiner

# WIRELESS BROADBAND NETWORK WITH INTEGRATED STREAMING MULTIMEDIA SERVICES

CROSS-REFERENCE TO RELATED APPLICATIONS

This application is a 35 U.S.C. 371 of International application of PCT/US2013/065573, entitled "WIRELESS BROADBAND NETWORK WITH INTEGRATED STREAMING MULTIMEDIA SERVICES," filed Oct. 18, 2013, which claims priority to U.S. Provisional Patent Application No. 61/716,194, entitled "A means for wireless cellular base stations streaming multimedia from local resources," filed on Oct. 19, 2012, the entire contents of which are hereby incorporated by reference.

FIELD

The present invention relates generally to apparatus, systems, and methods used for communication over wireless networks, and more particularly to the use of such networks to access multimedia content.

BACKGROUND

Historically, generation and storage of media content has been distinct from the network infrastructure used to distribute it. This is particularly true in the context of multimedia distribution within a wireless broadband networks. Cellular base stations may be constrained not only in the bandwidth available to user devices, but also in backhaul bandwidth available between the base station and the broader network infrastructure.

Audio/video servers and other multimedia content stores are maintained in centralized data centers or server farms. By having multimedia content stored in one or a few main locations, content owners are able to simplify administration, reduce capital expense, and importantly, control content distribution so as to maximize revenue. The tradeoff for these benefits is, the distance required to traverse from the content storage location to the actual point of distribution increases the necessary network bandwidth.

In order to address this problem, content delivery networks have recently been introduced. A content delivery network ("CDN") is an interconnected system of computers on the Internet that provides Web content rapidly to numerous users by duplicating the content on multiple servers and directing the content to users based on proximity CDNs can be used by Internet service providers to deliver static or dynamic Web pages. The technology is, however, especially well-suited to streaming audio, video, and Internet television programming.

In a CDN, content exists in multiple copies on strategically dispersed servers. This is known as content replication. A large CDN can have thousands of servers, making it possible to provide identical content to many users. When a specific page, file, or program is requested by a user, the server closest to that user, in terms of the minimum number of nodes between the server and the user, is dynamically determined. This optimizes the speed with which the content is delivered to that user.

The use of CDN technology has obvious economic advantages to enterprises who expect, or experience, large numbers of hits on their Web sites from locations all over the world. If dozens or hundreds of other users happen to select the same Web page or content simultaneously, the CDN sends the content to each of them. The creation and operation of a CDN, however, entails significant capital and operational expenses, ultimately resulting in fewer CDNs than are necessary to provide optimum distribution of multimedia content.

Recently, small cell content caching has been explored as a means of bringing the content closer to the user, or to the "edge." In these schemes, small cells cooperate to receive content from a CDN or some other central server. They cache the content on the edge and work together to distribute content to local users. While this scenario brings the content closer to the edge, it still relies upon receiving content from a CDN or other central server. What is lacking in the prior art is the caching and/or delivery of multimedia content that is captured and distributed at the edge, with little or no involvement with a CDN or central server.

SUMMARY OF THE INVENTION

In this invention, we disclose a multimedia streaming base station used preferably in a wireless communication network. The multimedia streaming base station is capable of capturing, storing, encoding, and transmitting multimedia via a local multimedia capture device. The multimedia base station can be a heterogeneous multi-RAT node, in which case the wireless communication network could be a heterogeneous mesh network. The multimedia base station could by a dynamic mesh node in alternate embodiments. Additional embodiments of the present invention include methods for facilitating streaming of locally captured multimedia content.

In one embodiment, there is a multimedia streaming base station comprising a media capture device; an encoder; and receive and transmit hardware. In an alternate embodiment, the multimedia streaming base station further comprises an encryptor. In yet an alternate embodiment, the multimedia streaming base station further comprises a memory device. And in yet another embodiment the multimedia streaming base station further comprises a GPS.

Additionally, embodiments of the present invention comprise a wireless communication network comprised of a plurality of multimedia streaming base stations having the architectural components described above. In additional embodiments, the wireless communication network could further comprise a computing cloud component. In yet another embodiment, the wireless communication network could further comprise a content server. In an additional embodiment, the wireless communication network could be a heterogeneous mesh network.

Additional embodiments of the present invention could be computer implemented methods for facilitating streaming of locally captured multimedia. In one of these embodiments, the method could comprise the steps of: (a) receiving a request from a user to receive a locally captured multimedia content via a wireless transmission; (b) accessing a memory where the locally captured multimedia content is stored; (c) sending a response to the user regarding the request; and (d) sending the locally captured multimedia content via a wireless transmission. In an alternate embodiment, of this method, the response is an acknowledgement of the availability of a single locally captured multimedia content or a program list of a plurality of locally captured and locally stored multimedia content.

In an additional embodiment, the computer implemented methods described above could further comprise authenticating a user who has requested streaming of the locally captured and locally stored multimedia content. There could be an additional embodiment of these methods further comprising evaluating a plurality of transmission pathways in order to determine if the locally captured multimedia content should be wirelessly transmitted via more than one transmission pathway. In an additional embodiment, the locally captured multimedia content could be transmitted via more than one transmission pathway. In an alternate embodiment, the locally captured multimedia content are divided into at least two subsets of locally captured multimedia wherein the at least two subsets of locally captured multimedia are transmitted over distinct transmission pathways.

DETAILED DESCRIPTION

Figure 1:
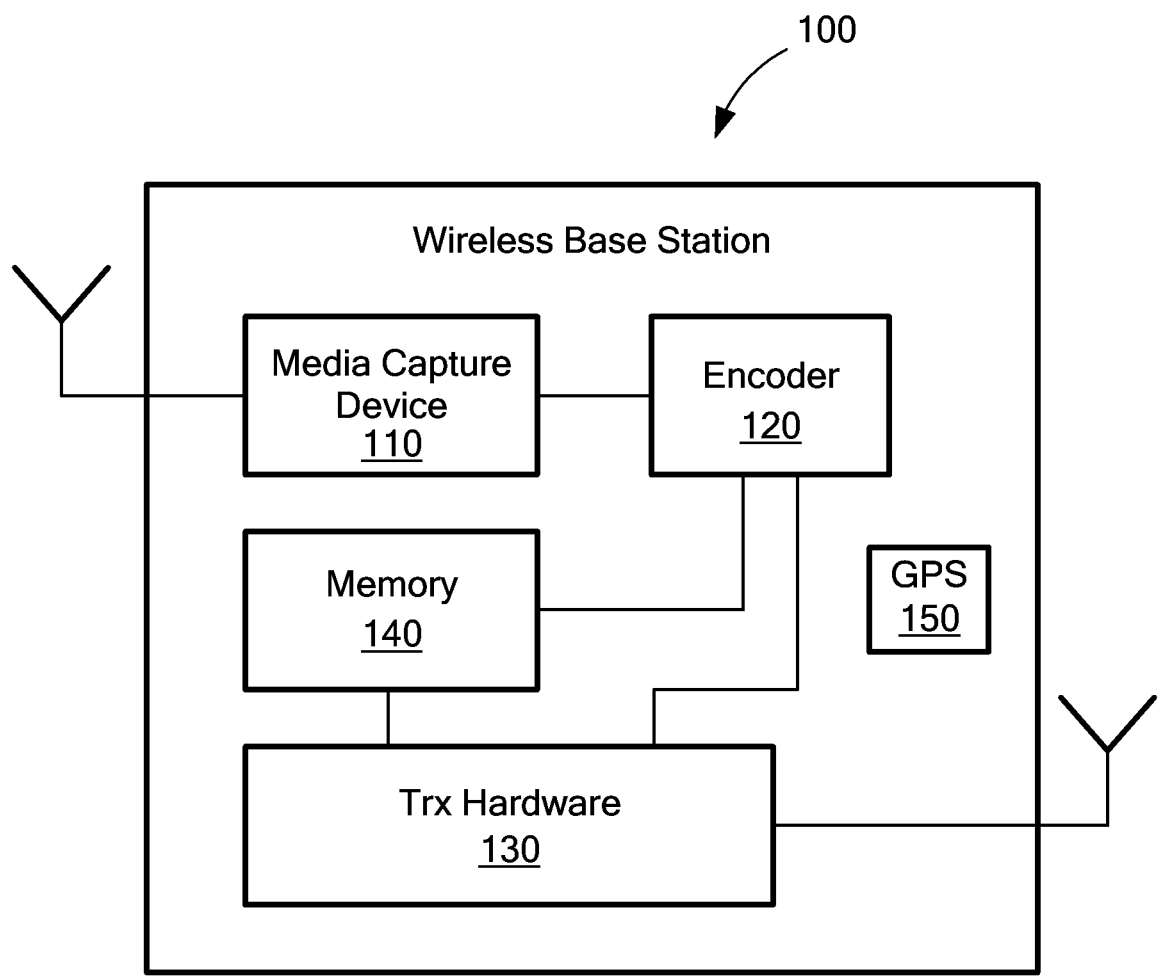
FIG. 1 is an illustration of a wireless base station used for streaming local multimedia content.

Embodiments of the present invention can capture and deliver multimedia content within a local wireless network. In these embodiments, there is no need to receive or cache multimedia content from a CDN or central server. Optionally, a central server could be integrated into the wireless network as an add-on feature if so desired. FIG. 1 shows an embodiment of a wireless base station 100 of the present invention. In this embodiment, the wireless base station 100 could be, without limitation, an LTE eNodeB, a CDMA/GSM cellular base station, a Wi-Fi access point, a WiMAX base station, or the like. The wireless base station 100 in certain embodiments is capable of operating over multiple frequency bands, using a variety of protocols and media access technologies as described in a co-pending and co-owned applications U.S. application Ser. No. 13/889,631 and PCT Application No. PCT/US13/61677 entitled "Heterogeneous Mesh Network and a Multi-RAT Node Used Therein," and filed on May 8, 2013 and Sep. 25, 2013 respectively, the contents of which are hereby incorporated in full by reference.

In one embodiment, the wireless base station 100 is comprised of a media capture device 110, an encoder 120, and receive/transmit hardware 130 compatible with the network protocols and frequencies over which the wireless base station 100 will communicate. The media capture device 110 could be an analog or digital TV tuner, an AM or FM tuner, a satellite TV tuner, an HD tuner, a satellite radio tuner, a live video camera, a live audio connection, media stored on a nonvolatile memory, such as an SD card, or the like. The media capture device 110, as its name implies, receives media that is broadcast over the airways. Examples of multimedia include television programming, radio transmission, surveillance camera imagery, local weather or traffic information, sporting events, concerts and theatrical productions, and the like. Once the media capture device 110, receives the multimedia, it can send it to an encoder 120 so that the local multimedia can encode the data into a bandwidth efficient standard.

In certain embodiments, the wireless base station 100 could be a multi-RAT node having hardware that supports multiple radio access/backhaul technologies. In a network embodiment of this invention, there could be a wireless communication network that is a comprised of a plurality of dynamic mesh nodes. As used in this application, we define the term "dynamic mesh node" as a mesh node that is capable of playing a dynamic role within a network. A dynamic role could mean, by way of example, being capable of being a client with respect to one node and a server with respect to another node in the network. Dynamic can also mean switching radio access technologies. Prior art mesh nodes did not have the ability to play a dynamic role within a network. Rather, as can be seen from the above two definitions, mesh nodes acted as a base station access point and router. These roles were predetermined. The nodes within the mesh networks did not dynamically function as a client to one node, and a server to another, nor did they dynamically change transmit frequencies or protocols, for example.

Multiple Radio Access Technology ("multi-RAT") Nodes

The concept of multiple radio access technology will also be defined. The term "radio access technology" indicates the type of radio technology used to access a core network. Multiple radio access technology, or multi-RAT, is a radio technology capable of operating in varying parameters. These varying radio parameters could be, for example, different protocols, different duplexing schemes, wired versus wireless, disparate frequency bands, and the like.

By disparate frequency bands, we mean frequencies from different categories of standards, or from generally accepted frequency ranges for a given technology. For example, the Wi-Fi protocol standard is currently authorized for use at two different frequencies in the United States, 5 GHz according to the 802.1a standard and 2.4 GHz according to the 802.1b standard. However, the message format, media access method, etc. are identical regardless of the frequency used. Thus, in our lexicography, a device that could communicate using Wi-Fi at both 5 GHz and 2.4 GHz would not be a multi-RAT device or node because both of these frequencies are considered within the art to represent instances of the Wi-Fi protocol. An example of a radio capable of operating in disparate frequency bands would be a radio that could work in a Wi-Fi band of either 2.4 GHz or 5 GHz and that same radio could also operate at 700 MHz or any other cellular frequency band, which requires a different media access method and/or a different message format. This type of a radio is an example of a multi-RAT node.

Similarly, we use the term "heterogeneous mesh network" to mean at least two dynamic mesh nodes capable of: using different protocols, or different duplexing schemes, or operating in disparate frequency bands, or using different transmit/receive mediums, such as wired versus wireless. Different protocols may include Wi-Fi, 2G, 3G, 4G, WCDMA, LTE, LTE Advanced, ZigBee, or Bluetooth. Different duplexing schemes may include time division, code division, and frequency division schemes. Disparate frequency bands may include so-called "whitespace," VHF and UHF channels, cellular telephony bands, public safety bands, and the like.

The wireless base station 100 could further include SON intelligence either internally or by virtue of a connection to a computing cloud component 210 having SON intelligence stored thereon. For a further discussion of what is meant by the term "SON intelligence" as used in this application, see co-pending and co-owned U.S. application Ser. No. 14/024,717 and PCT/US13/61656 entitled "Heterogeneous Self-Organizing Network for Access and Backhaul," filed on Sep.

12, 2013 and Sep. 25, 2013 respectively, the entire contents of which are hereby incorporated by reference.

In terms of determining a bandwidth efficient standard into which the encoder 120 should encode the local multimedia captured by the wireless base station 100, the encoder 120 could use a default standard or it could be told by SON intelligence the standard to which it should encode. The encoder 120 could also optionally encrypt the multimedia.

Once the encoder 120 performed its tasks, it could directly transmit the encoded multimedia via the transmit hardware 130. In an alternate embodiment, the encoder 120 could instead send the encoded multimedia to a memory 140 device for local caching. In yet an alternate embodiment, the encoder 120 could transmit and store the encoded multimedia. In each of these embodiments, the transmit hardware 130 could transmit the multimedia data via unicast, broadcast, and/or multicast techniques to a group of local users.

The wireless base station 100, in an alternate embodiment could include a GPS 150 chip, which would facilitate location determination of the multimedia content. In an alternate embodiment, the location of the wireless base stations could be provisioned.

In an alternate embodiment, there is a wireless communication network 200 comprised of a plurality of wireless base stations 100. In this wireless communication network 200, the plurality of wireless base stations 100 are communicatively coupled to one another in a mesh network. In alternate embodiments, the wireless base stations 100 could be communicatively coupled via any suitable high-speed networking technique, e.g., Ethernet, fiber, microwave, and the like. In this embodiment, the plurality of wireless base stations 100 could work together using SON intelligence or other cooperative software techniques to correlate user demand with available resources. For example, the wireless base stations 100 may exchange information about the number of users each is servicing and the number of requests each has received for a particular piece of local multimedia content.

Figure 2:
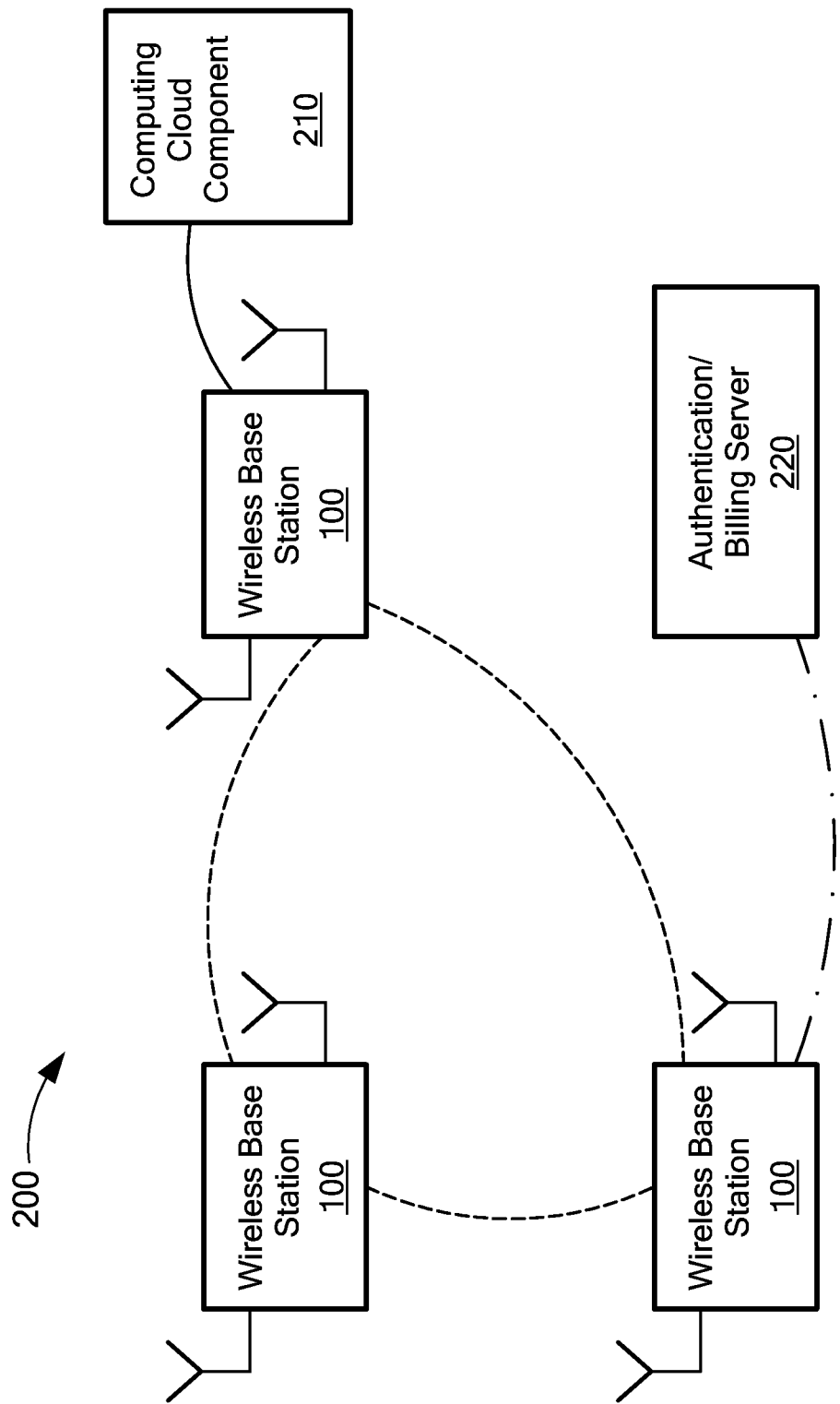
FIG. 2 is an illustration of a wireless network of base stations used for streaming local multimedia content.

Assuming that the wireless communication network 200 was comprised of three wireless base stations 100, as depicted in FIG. 2, the wireless base stations 100 could cooperatively determine the three most popular multimedia requests at any given instance. The wireless base stations 100 could make this determination using SON intelligence stored locally or in conjunction with SON intelligence stored in a computing cloud component 210, which could optionally be part of the wireless communication network 200.

After making this determination, the three wireless base stations 100 could divide up the responsibilities for tuning into, capturing, and streaming the three most popular multimedia programs either as live streaming or as cached content. Each wireless base station 100 could have more than one media capture device 110, which would enable it to tune into and capture a commensurate number of multimedia transmissions. Additionally, user demand for multimedia could be monitored in real-time; and wireless base station 100 resources could be dynamically altered to accommodate that demand.

Figure 3:
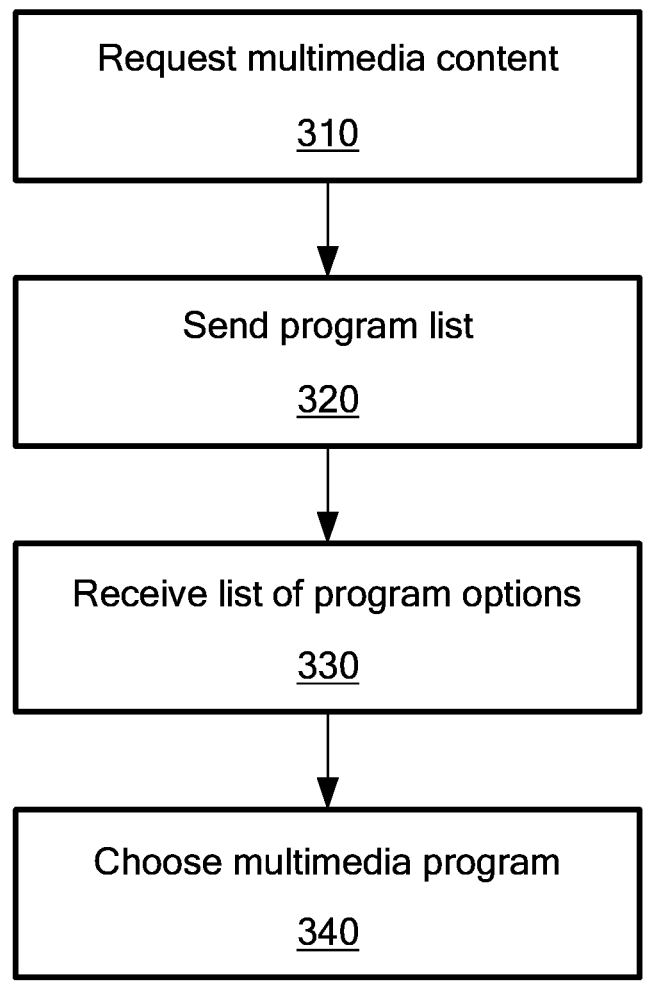
FIG. 3 illustrates a method for distributing local multimedia content in a wireless network.

In an alternate embodiment, users could request multimedia via an application ("app") stored locally on their user equipment. FIG. 3 shows the steps of a method for streaming multimedia content according to this embodiment. In this embodiment, a user could request 310 streaming of a particular type of multimedia. The multimedia available is locally captured and locally stored with respect to the wireless communication network 200.

Alternatively, the user could request 310 a program list that contains all of the different multimedia that are available for streaming. The program list could include free content, prepaid for content, or content for purchase. It could, in the case of public safety/first responder applications, include confidential transmissions available to authorized personnel only. In this embodiment, an authentication server 220 could also be a part of the wireless communication network 200. The program options could also take into consideration the user's location information.

The user's request for multimedia content could be received by a wireless base station 100 or by a computing cloud component 210, which is optionally part of the wireless communication network 200. In either case, the wireless base station 100 or the computing cloud component 210 will prepare and send 320 a response to the request for multimedia content. The response could be an acknowledgement of the availability of the single multimedia content that was requested, or it could be a program list containing some or all of the multimedia content available to that particular user at that particular time. In some situations, a user may have asked "what's available," and in other situations, a user may have asked for a specific type of multimedia content, whether it be a specific program, radio show, live event, security camera feed, traffic camera, and the like. If a user requests a particular type of content that a wireless base station 100 cannot provide, the wireless base station 100 or the computing cloud component 210 could nonetheless track the request for heuristics purposes.

Once the user receives 330 the program list, he could choose 340 which multimedia content he would like to receive. Of course, the user could dynamically decide to switch his multimedia request, which would cause the steps of this method to be repeated.

In some embodiments, there could also be an authentication/billing server 220 in the wireless communication network 200. This authentication/billing server 220 could determine whether a particular user is authorized to receive the multimedia he has requested. The authentication/billing server 220 could also provide information to wireless base stations 100 prior to them creating a programming list that allows the wireless base stations 100 to create a list of pre-authorized programs for a particular user, and perhaps in additional embodiments, a list of programs available for the user to purchase. If the multimedia is encrypted, the authentication/billing server 220 could further verify, through well know authentication techniques, if the user is authorized to receive encrypted data. Moreover, the authentication/billing server 220 could ensure that the user receives the appropriate keys to decrypt the multimedia content. Additionally, the billing server 220 could track multimedia consumption by users and could provide billing information to network operators.

In some embodiments, the wireless base stations 100 could create a media pool. A media pool could be useful if a single local base station does not have all of the media stored locally that it is being requested by its users to provide. In this situation, each wireless base station 100 in the wireless communication network 200 could share information about its local media capabilities, multimedia that it may have cached, and the like. This information could be collected by a single wireless base station 100 or a computing cloud component 210 and pooled to create a media pool.

In this embodiment, if a user sends a request for multimedia to its servicing base station 100 and that base station 100 does not have the requested content, it could consult the media pool to determine if another base station 100 within the wireless communication network 200 has the content. If another base station 100 has the content, the original base station 100 that received the request could exchange backhaul routing information with the base station 100 having the content so as to determine the backhaul costs associated with providing the requesting user with the content given her location. Optionally, the backhaul cost could be used to determine whether to stream the multimedia content to the requesting user. Additionally, meshed path, quality of service, link quality, and the like could be used to determine the optimum media source and media quality for streaming multimedia to any given user.

In an alternate embodiment, a wireless base station 100 having more than one type of transmission hardware, e.g., a Wi-Fi radio card, an LTE radio card, a TV White Space radio card, and the like, could, upon receiving a request 310 for streaming of locally captured multimedia, could evaluate the capacity of its various transmission pathways in order to determine the most efficient means of transmitting the multimedia content to the user. By way of example, and without limitation, the wireless base station 100 could use SON intelligence to make this determination, either on its own or in conjunction with a computing cloud component 210. If the wireless base station 100 determines that it would be most efficient to stream the multimedia content over two or more transmission pathways simultaneously, its internal logic could parse the multimedia content into one or more subsets of the original multimedia content. Each of these subsets could then be streamed over two or more transmission pathways within the wireless base station 100.

In some embodiments, wireless base stations 100 can cache content, whether they are the original receiving node for the content, or if they are a relay node in the context of a media pool being used to deliver multimedia. In an alternate embodiment, the wireless communication network 200 could include a separate content server used to cache multimedia.

The foregoing discussion discloses and describes merely exemplary embodiments of the present invention. In additional embodiments, the methods described herein can be stored on a computer readable medium such as a computer memory storage, a compact disk (CD), flash drive, optical drive, or the like. Further, the computer readable medium could be distributed across memory storage devices within multiple servers, multi-RAT nodes, controllers, computing cloud components, and the like. As will be understood by those skilled in the art, the present invention may be embodied in other specific forms without departing from the spirit or essential characteristics thereof. For example, wireless network topology can also apply to wired networks, optical networks, and the like. Various components in the devices described herein may be added, removed, or substituted with those having the same or similar functionality. Various steps as described in the figures and specification may be added or removed from the processes described herein, and the steps described may be performed in an alternative order, consistent with the spirit of the invention. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology.

What is claimed is:

1. A method of operating a heterogenous mesh network including two dynamic mesh nodes, the method comprising:
   receiving, a request from a user to receive a multimedia content via a wireless transmission;
   determining whether the multimedia content has been captured and stored at a network edge device;
   determining that another network edge device has the multimedia content;
   exchanging backhaul routing information with the other network edge device to determine backhaul costs associated with providing the multimedia content based on a location of the user;
   receiving and caching the multimedia content from the other network edge device;
   determining a capacity of various transmission pathways for transmission of the multimedia content from the network edge device;
   receiving a determination from a self-organizing network (SON) intelligence stored in a computing cloud component of at least one transmission pathway for the network edge device to be used for transmission of the multimedia content to the user based on the determined capacity of various transmission pathways;
   transmitting the multimedia content located at the network edge device to the user; and
   wherein a dynamic mesh node acts as a client to one node and a server to another mesh node.

2. The method of claim 1, further comprises transmitting a response to the user regarding the request, wherein the transmitting a response comprises transmitting an acknowledgement of the availability of a single multimedia content or a program list of a plurality of multimedia content.

3. The method of claim 1, further comprising authenticating a user who has requested streaming of the multimedia content.

4. The method of claim 1, further comprising transmitting the multimedia content via more than one transmission pathway.

5. The method of claim 1, wherein the multimedia content is divided into at least two subsets of multimedia and transmitting the at least two subsets of multimedia over distinct transmission pathways.

6. The method of claim 1 further comprising a plurality of small cells receiving content from a Content Delivery Network (CDN) and caching the content at the network edge device.

7. The method of claim 1 further comprising a plurality of small cells receiving content from a central server and caching the content at the network edge device.

8. The method of claim 1 further comprising creating a media pool by the nodes of the heterogenous mesh network and sharing, by each node of the heterogenous mesh network, information about the nodes local media capabilities and multimedia content the node has cached.

9. The method of claim 1 further comprising switching, by a dynamic mesh node, radio access technologies.

10. The method of claim 9 wherein the switching radio access technologies includes dynamically changing transmit frequencies or protocols.

* * * * *